United States Patent
Hurst

[11] Patent Number: 5,845,957
[45] Date of Patent: Dec. 8, 1998

[54] RETRACTABLE CANOPY

[75] Inventor: Ronald W. Hurst, Kelowna, Canada

[73] Assignee: Tukit Retractable Canopies Inc., Kelowna, Canada

[21] Appl. No.: 878,619

[22] Filed: Jun. 19, 1997

[51] Int. Cl.$^6$ ................................................ B60P 7/02
[52] U.S. Cl. .................... 296/100; 296/105; 135/88.09
[58] Field of Search ............... 135/88.02, 88.09, 135/88.13, 88.14, 88.16, 96, 124, 128, 129, 130, 155, 156; 296/104, 105, 100, 101, 43

[56] References Cited

U.S. PATENT DOCUMENTS

| | | | |
|---|---|---|---|
| 2,129,893 | 9/1938 | Walden | 299/105 |
| 2,516,713 | 7/1950 | McClure | 296/104 |
| 2,610,086 | 9/1952 | Shield | 296/105 |
| 2,670,988 | 3/1954 | Cook | 296/105 |
| 2,824,764 | 2/1958 | Stirling | 296/105 |
| 2,853,340 | 9/1958 | Hershberger | 296/137 |
| 3,165,352 | 1/1965 | Hallock et al. | 296/100 |
| 3,231,305 | 1/1966 | Beckman | 296/100 |
| 3,612,602 | 10/1971 | Stepp | 296/106 |
| 3,688,787 | 9/1972 | Feather | 135/7.1 A |
| 4,252,363 | 2/1981 | Rodrigue | 296/100 |
| 4,342,480 | 8/1982 | Ross, Jr. | 296/100 |
| 4,639,034 | 1/1987 | Amos | 296/100 |
| 4,721,336 | 1/1988 | Jones | 296/100 |
| 4,789,196 | 12/1988 | Fields | 296/100 |
| 4,902,064 | 2/1990 | Tuerk et al. | 296/105 |
| 5,005,896 | 4/1991 | Li | 296/100 |
| 5,203,603 | 4/1993 | Hertzberg et al. | 296/100 |
| 5,238,288 | 8/1993 | Chandler | 296/100 |
| 5,338,084 | 8/1994 | Wardell | 296/105 |
| 5,443,295 | 8/1995 | Moberly | 296/105 |
| 5,524,953 | 6/1996 | Shaer | 296/100 |
| 5,531,497 | 7/1996 | Cheng | 296/100 |
| 5,556,156 | 9/1996 | Kirk | 296/100 |

FOREIGN PATENT DOCUMENTS

| | | | |
|---|---|---|---|
| 1172289 | 8/1984 | Canada | 296/62 |
| 2004223 | 5/1990 | Canada | 296/101 |
| 2004224 | 8/1990 | Canada | . |

*Primary Examiner*—Lanna Mai
*Attorney, Agent, or Firm*—Antony C. Edwards

[57] ABSTRACT

A retractable canopy and supporting structure for mounting onto the load bed of a vehicle wherein the supporting structure may be selectively slid along longitudinally extending guide rails on opposite sides of the load bed and wherein the primary supporting structure is sufficiently stable so as to resist one side of the primary support structure member from sliding along its corresponding guide rail without there being corresponding sliding movement of the opposite end of the primary structure member on the opposite guide rail when the primary structure member is urged longitudinally along the guide rails from only one side of the load bed, and wherein when the canopy is deployed over the load bed and the primary structure latched to the rearmost end of the load bed, the canopy is maintained taut over the supporting structure by resilient springs mounting the forward end of the canopy to the forward end of the load bed or to the vehicle cab.

5 Claims, 8 Drawing Sheets

RETRACTABLE CANOPY

This application claims priority benefit of the provisional application Ser. No. 60/020,236 filed on Jun. 21, 1996.

FIELD OF THE INVENTION

This invention relates to the field of canopies for truck beds and the like, which canopies may be retracted along the length of the truck bed so as to be stored within typically a housing located behind the truck cab and which may be extended from the housing so as to be repeatedly deployable to cover substantially the entire length of the exposed truck bed.

BACKGROUND OF THE INVENTION

It is known in the prior art to have flexible canopies which may be retracted into a housing and repeatedly deployed therefrom so as to selectively cover and uncover a cargo holding area on a vehicle such as a truck bed on a conventional pickup truck. The main problem with such prior art devices, and the solution to which it is the object of the present invention to provide, is providing a simple inexpensive mechanism so that the canopy may be deployed by one person exerting a force on one side only of the canopy without the canopy binding or otherwise jamming thereby requiring that person to move back and forth between either side of the truck to assist in urging the canopy from its housing to its fully deployed position.

A typical arrangement in the prior art devices is for a flexible canopy to be supported by a plurality of canopy supporting structures extending beneath the canopy and over the truck bed from one side wall of the truck bed to the opposing side wall, the members adapted at their base for sliding along the truck walls.

For example, applicant is aware of U.S. Pat. No. 4,789, 196 which issued to Fields on Dec. 6, 1988 for a Convertible Top for Pickup Trucks. Fields teaches a convertible top for pickup trucks having front and rear shells with a collapsible canopy therebetween, the rear shell movable on side rails from a retracted to and extended position of the top. The rear shell telescopes into the front shell in its closed position. The canopy is supported on a plurality of bows extending between oppositely disposed rails on the sides of the truck bed. A flexible sheet is supported over the bows and fixed to the front shell at its rearward edge and to the rear shell at its forward edge. The rear shell is supported on the rails by a pair of oppositely disposed carriages. The bows and carriages rely on anti-friction liners such as made of nylon for sliding over the rails. The nylon liners at the ends of the bows have a constricted central portion, with flared ends. The constricted central portion has a loose fit on the rails so as to be slidable thereon. The carriages have a slide bearing, suitably of nylon, disposed in the slide passage. The slide bearing has on its inner surface a set of three ribs adapted to engage the track of the rail. The slide bearing is open at its bottom to allow it to fit over the web section of the track. What is neither taught nor suggested by Fields is the tensioning of the bows of the present invention so as to resist binding of the bows when slid along the rails. Further, what is neither taught nor suggested by Fields, and that which it is the object of the present invention to provide, is resiliently biasing the forward edge of the canopy within the front shell rather than attaching the canopy directly to the front shell so that the canopy is resiliently tensioned so as to provide flexibility in fitment and so as to maintain a taut canopy in the event of stretching and shrinking of the canopy due to environmental conditions.

It is an object of the present invention in the group of such devices which rely on the canopy supporting members sliding along rails or tracks mounted to the upper regions of the side walls of the truck box, to provide a simple structure which is sufficiently stable so as to resist one side of the member from sliding along its rail or track longitudinally along the side walls of the truck bed without there being corresponding sliding movement of the opposed end of the member of the opposed side wall of the truck when the member is urged longitudinally from only one of its ends.

SUMMARY OF THE INVENTION

A retractable canopy and supporting structure for mounting onto the load bed of a vehicle wherein the supporting structure may be selectively slid along longitudinally extending guide rails on opposite sides of the load bed and wherein the primary supporting structure is sufficiently stable so as to resist one side of the primary support structure member from sliding along its corresponding guide rail without there being corresponding sliding movement of the opposite end of the primary structure member on the opposite guide rail when the primary structure member is urged longitudinally along the guide rails from only one side of the load bed, and wherein when the canopy is deployed over the load bed and the primary structure latched to the rearmost end of the load bed, the canopy is maintained taut over the supporting structure by resilient springs mounting the forward end of the canopy to the forward end of the load bed or to the vehicle cab.

In summary, the retractable vehicle canopy for a vehicle of the present invention comprises a pair of guide means mountable longitudinally in parallel opposed relation on opposite sides of a vehicle load bed so as to extend the guide means longitudinally in a first direction along the load bed, a carriage member releasably mountable into sliding engagement with the guide means so as to extend the carriage member laterally across the load bed in a second direction, perpendicular to the first direction, between the pair of guide means extending longitudinally in the first direction. The carriage member has a hoop member rigidly mounted to, and extending between, carriage shoes mounted to opposite ends of the hoop member, the carriage shoes releasably mountable into sliding engagement along the guide means. The carriage shoes have sliding pressure transfer means for applying a first force vertically downward from the hoop member onto upper bearing surfaces on the guide means, and a second force generally horizontally inwards in the second direction against corresponding lateral bearing surfaces on the guide means. The hoop member has a flexed lateral dimension in the second direction, when measured between opposed ends of the hoop member, so that when releasably mounted in sliding engagement with the guide means, the flexed lateral dimension is greater than the same lateral dimension when the hoop member is non-flexed, i.e., measured between the opposed ends of the hoop member when the hoop member is removed from the guide means. Thus, the hoop member is resiliently spreadable between a non-flexed position and a flexed position corresponding to the non-flexed dimension and the flexed dimension respectively, whereby the hoop member may be spread laterally outwardly in the second direction for releasable slidable mounting of the carriage shoes into sliding engagement with the guide means. A flexible canopy is provided, releasably mountable at a rear edge thereof to the carriage member and at a forward edge thereof to the vehicle whereby, when the carriage is slid along the guide means in the first direction, the canopy may be deployed over the load bed or retracted so as to uncover the load bed. The carriage member is releasably latchable by latching means to a rearmost end of the load bed. The hoop member is sufficiently rigid so that, when in the flexed position, the carriage shoes may be releasably mounted into sliding engagement with the guide means, and the second force thereby applied against the corresponding lateral bearing surfaces on the guide means. The carriage shoes have a sufficient longitudinal dimension in the first direction so that, when releasably mounted into sliding engagement on the guide means, the carriage shoes stabilize the hoop member in relation to the guide means and equally distribute the second force along the corresponding lateral bearing surfaces on the guide means.

Advantageously, the guide means are a laterally spaced apart pair of guide rails mountable onto the side walls of a vehicle having a load box and the sliding pressure transfer means are wheels or sliding plates or bearings either mounted to the shoes or to the guide rails or disposed therebetween to facilitate smooth sliding of the shoes over the guide rails when the horizontal pressure is applied by the sliding pressure transfer means against the corresponding bearing surface on the guide rails.

In a further aspect, the hoop member is stabilized relative to the shoes by a second member extending from an uppermost end of the hoop member to the shoes so that, in one aspect of the present invention, a triangular longitudinal cross-section is thereby formed of the hoop member, the second member, and the shoes.

Further advantageously, secondary hoops are mounted for sliding engagement along the guide rails between the forward edge of the canopy and the rearmost edge of the canopy and releasably mounted to an interior surface of the canopy whereby when the canopy is deployed by sliding of the carriage along the guide rails in the first direction, the secondary hoops are pulled by the canopy along the guide rails so as to support the canopy over the load box.

Any further aspect, the canopy may be releasably tensioned so as to be pulled taut over the hoops over the load box by tensioning means acting between the rearmost edge of the canopy and a rearmost end of the load box and resilient biasing means mounted between the vehicle and the forward edge of the canopy.

DETAILED DESCRIPTION OF THE PREFERRED EMBODIMENT

Figure 1:
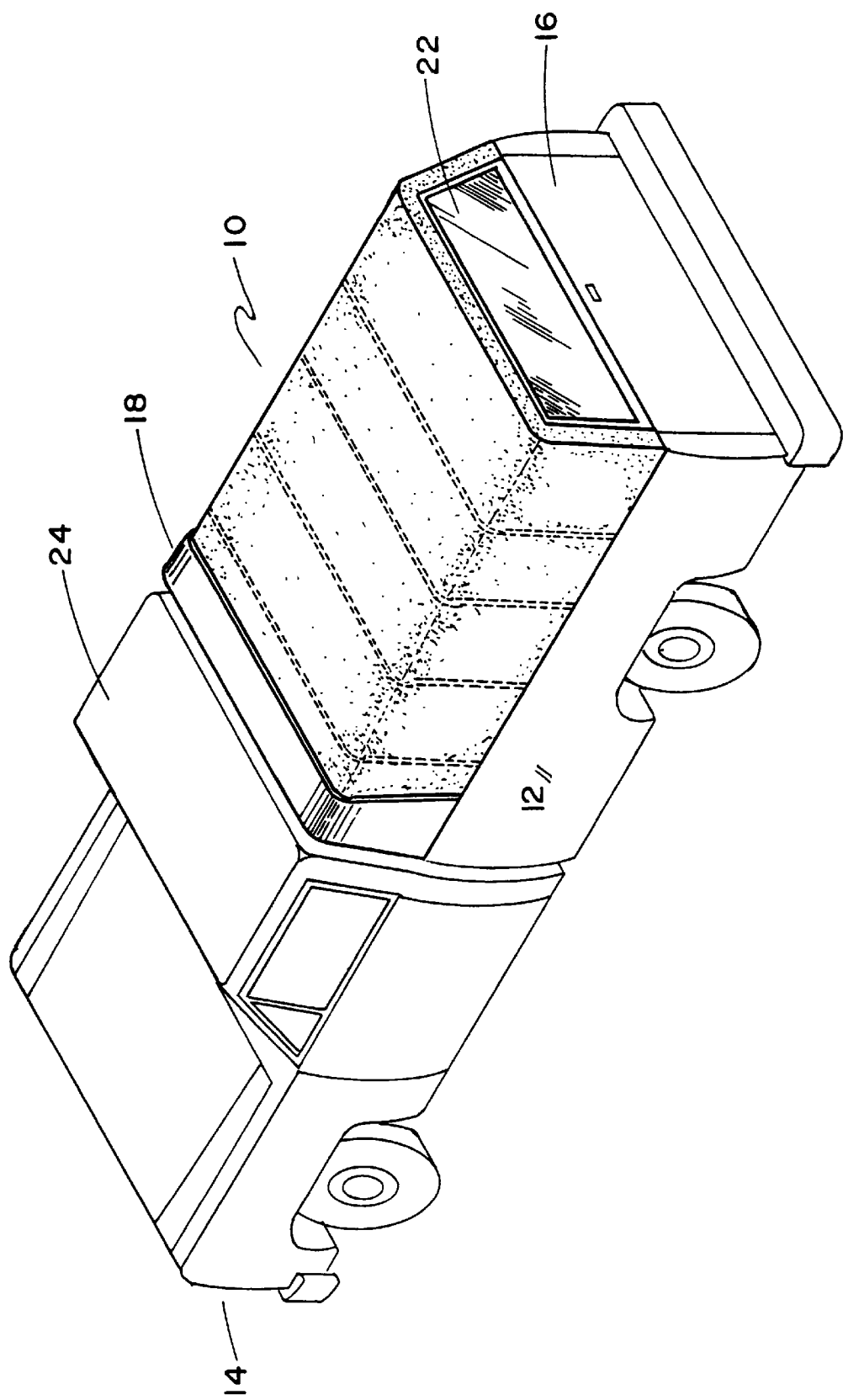
FIG. 1 is, in perspective view, the retractable vehicle canopy of the present invention in its deployed position over the load bed of a pickup truck.
Figure 2:
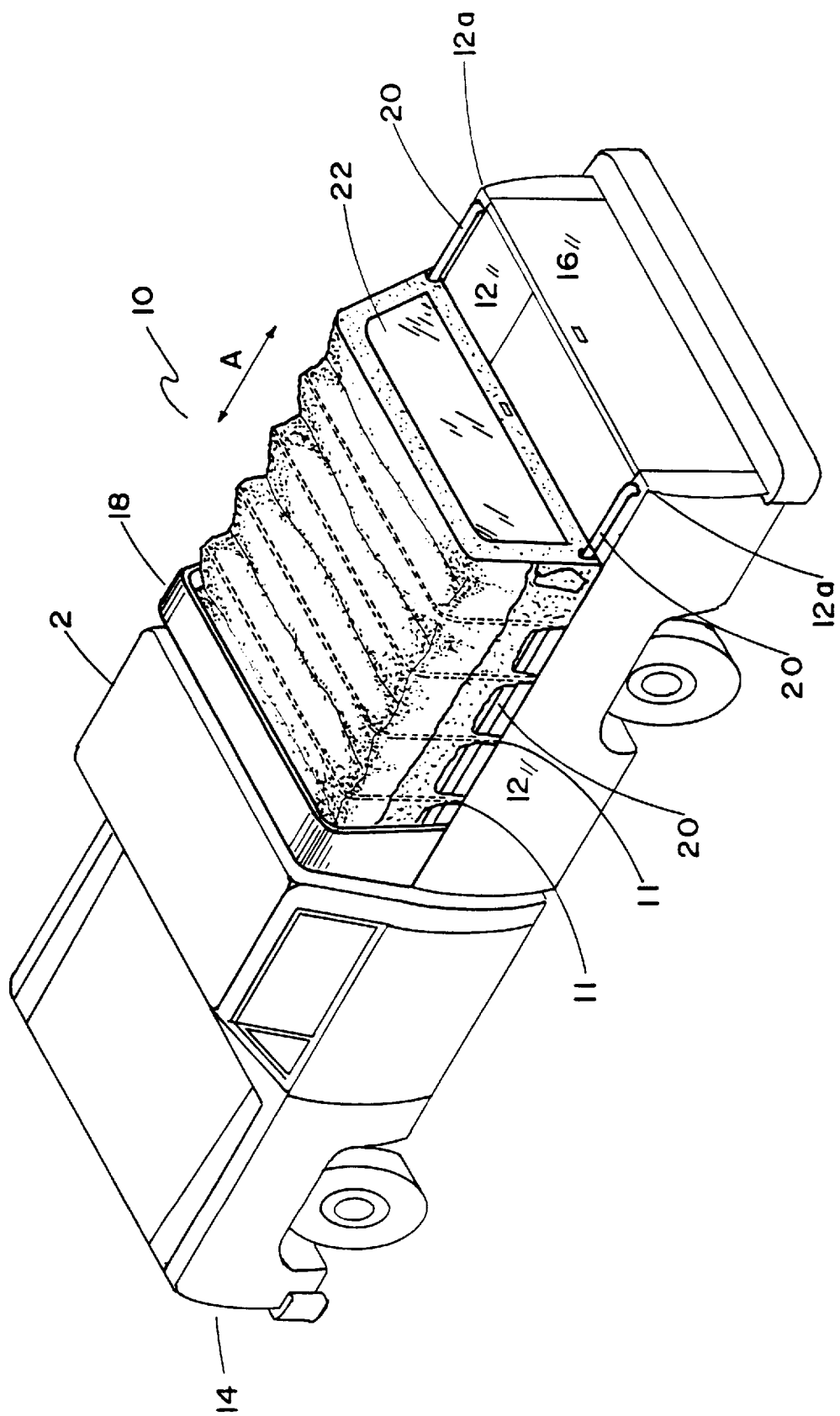
FIGS. 2 and 3 are the retractable vehicle canopy of FIG. 1 being retracted into its retracted position.
Figure 3:
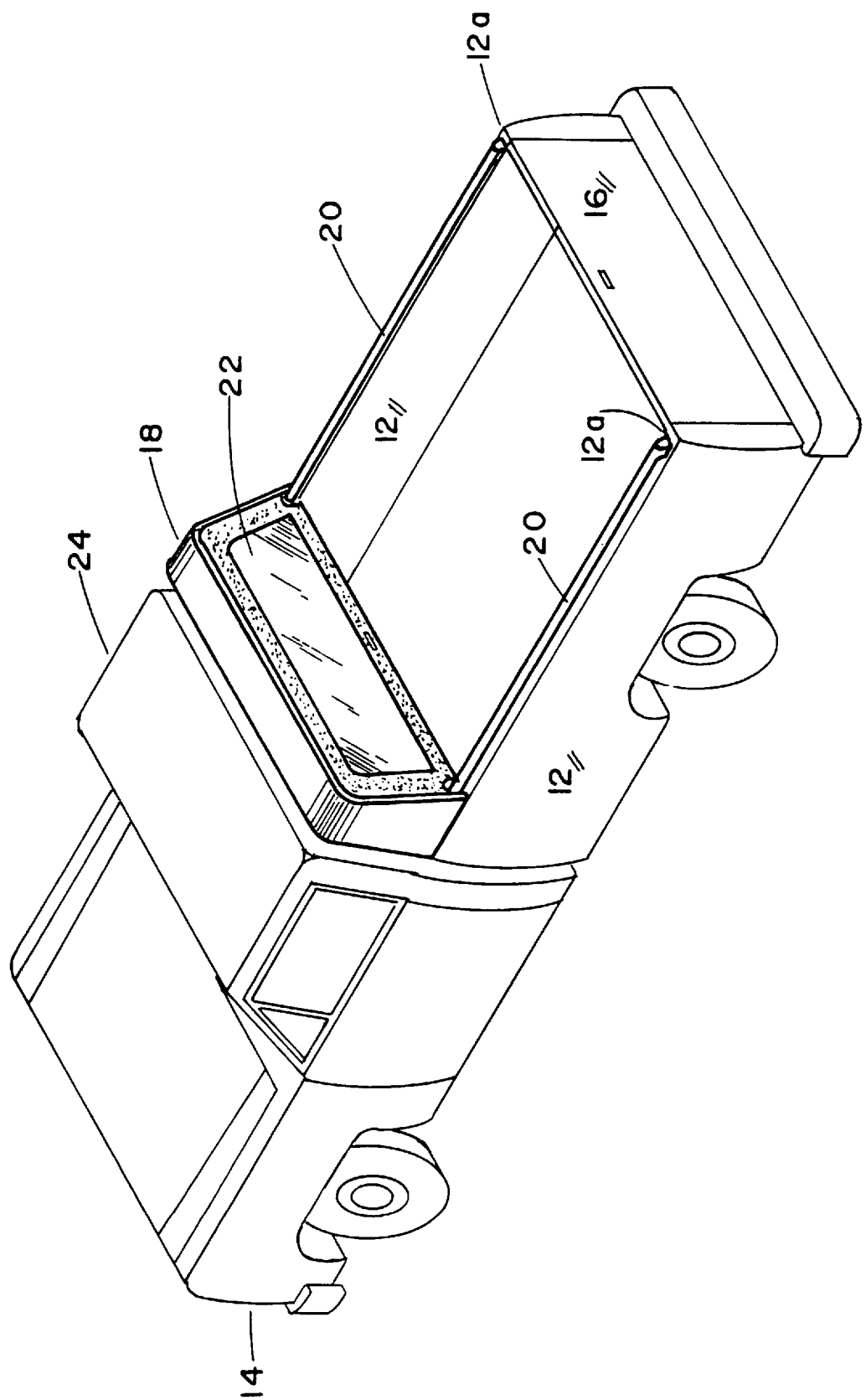

As illustrated in FIGS. 1–3, canopy 10, which may be of canvas or like flexible material is mountable on side walls 12 on truck 14 so as to be retractable and deployable from and to a fully extended position illustrated in FIG. I wherein canopy 10 extends between the tailgate 16 of truck 14 and housing 18.

As illustrated in FIG. 2, canopy 10 may be retracted or deployed in direction A along rails 20, one of each of a pair of rails 20 mounted on each of opposed side walls 12 on truck 14.

FIG. 3 illustrates how in the preferred embodiment a rear face 22 of canopy 10 is flush with the opening of housing 18 when canopy 10 is retracted in direction A so as to be contained within housing 18, housing 18 advantageously mounted immediately rearward and adjacent cab 24 on truck 14.

Figure 4:
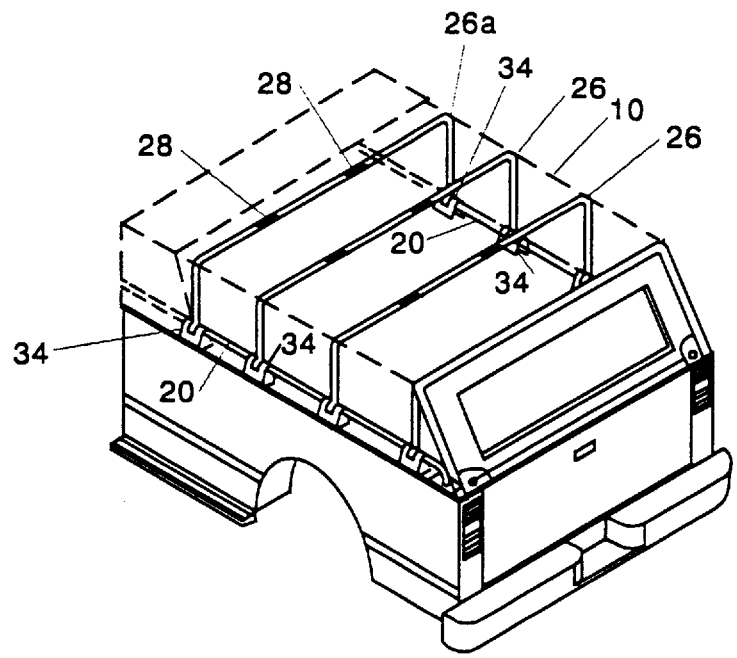
FIG. 4 is, in perspective view, the canopy supporting structure of the retractable vehicle canopy of the present invention.

As illustrated in FIG. 4, when canopy 10 (shown in dotted outline) is deployed, hoops 26, which may be secured by VELCRO (hook and loop fastener) loops 28 or the like to the interior of canopy 10, are also deployed to support canopy 10 over rails 20.

Figure 5:
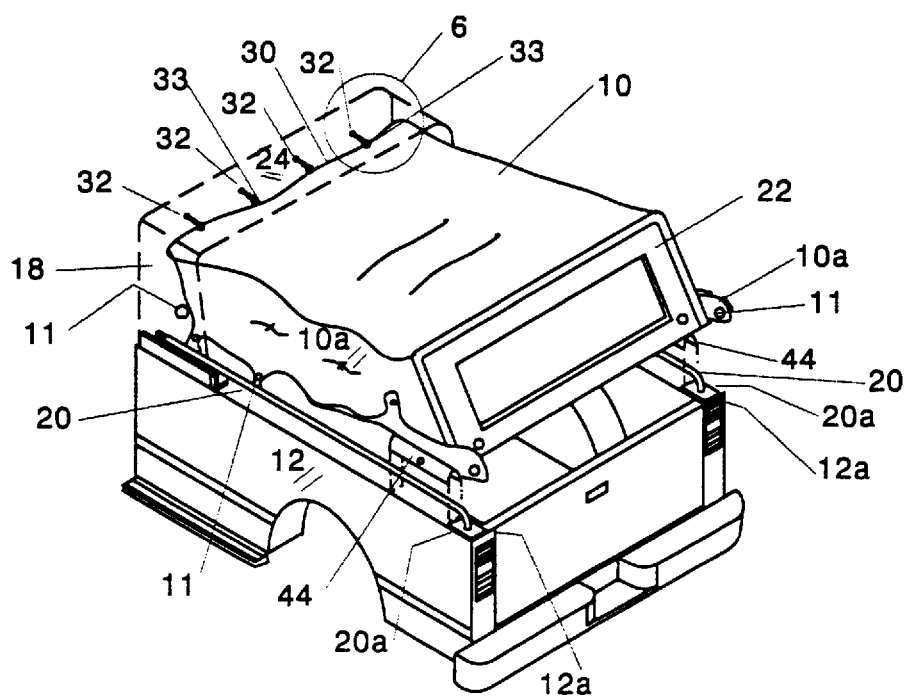
FIG. 5 is, in partially exploded view, the retractable vehicle canopy and supporting structure of the retractable vehicle canopy of the present invention.
Figure 6:
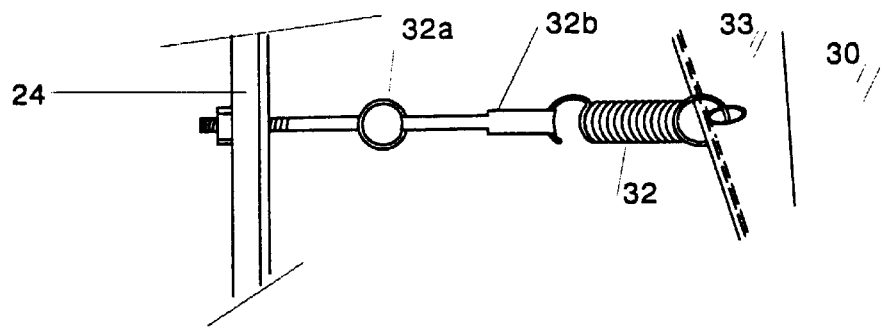
FIG. 6 is, an enlarged view of the canopy resilient tensioning means of FIG 5.

As seen in FIGS. 5 and 6, the forward end 30 of canopy 10 may be resiliently secured to cab 24 within housing 18 by means of springs 32 (better seen in FIG. 6) or like resilient biasing means. FIG. 5 shows canopy 10 in exploded view above rails 20. Housing 18 is shown in dotted outline. Springs 32 may be secured to cab 24 by eyebolts 32a and links 32b, and may be secured to forward end 30 of canopy 10 by cloth tabs 33. Canopy 10 may have side flaps 10a which fold down over rails 20 and secure by means of snaps 11 or the like over rails 20 onto side walls 12 or, as illustrated, onto shoes 34.

Hoops 26a and 26b are slidingly supported at their ends on rails 20 by means of shoes 34 better seen in FIG. 6.

Figure 7:
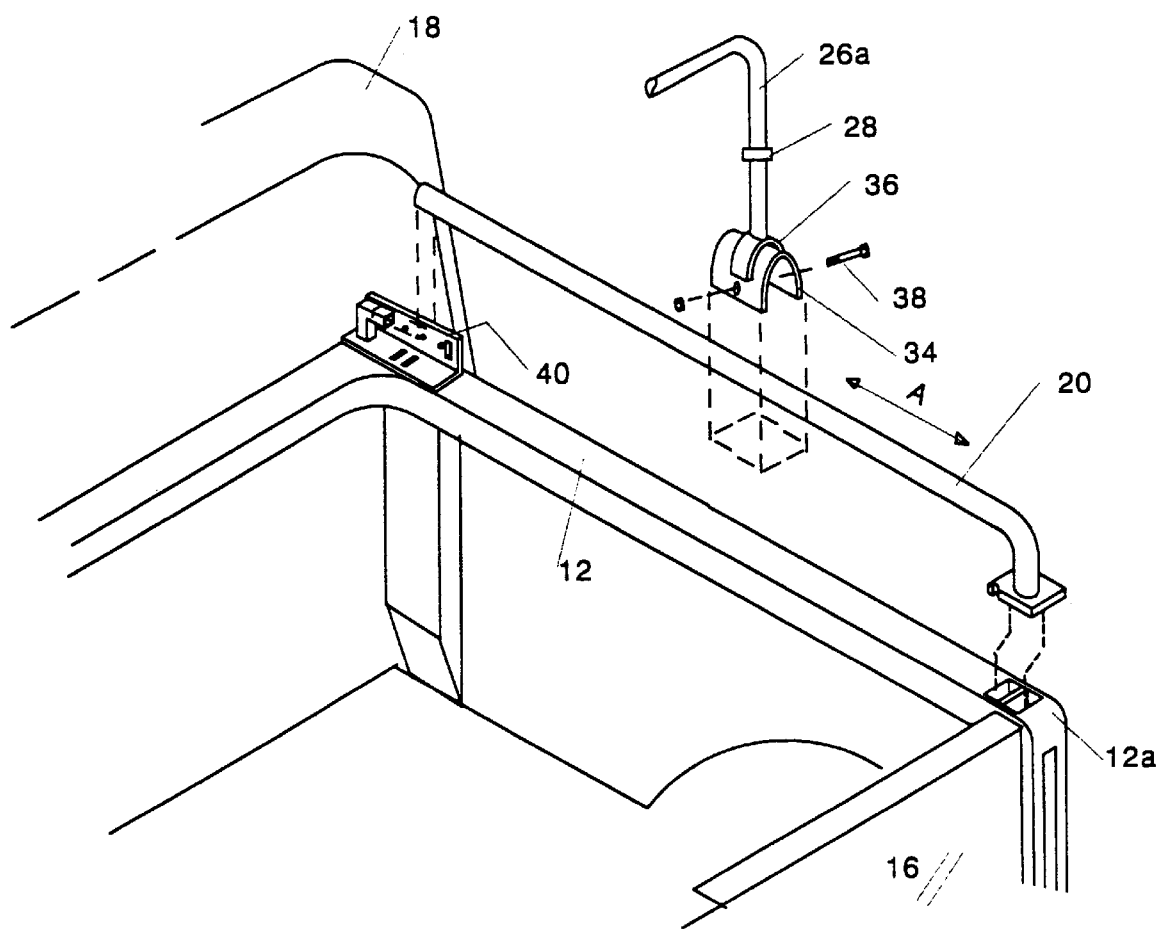
FIG. 7 is, in exploded perspective partial cut-away view, a guide rail and hoop of the retractable vehicle canopy of the present invention.

As seen in FIG. 7 in exploded view, shoe 34 may be in the shape of a generally inverted U, sized to snugly fit over rail 20 for sliding therealong by means of vertically oriented wheel 36 mounted to shoe 34. Wheel 36 is mounted to the uppermost end of shoe 34 and journalled in an aperture therethrough so as to roll along the top of rail 20, the top of rail 20 serving as a bearing surface for the downward force of the weight of canopy 10 and hoop 26 directed onto railing 20 through wheel 36. Hoops 26, including hoop 26a, have shoes 34 mounted rigidly thereto at their ends. Advantageously, shoe 34 may have bolt 38 across the lowermost ends of shoe 34 passing beneath rail 20. Mounting plate 40 may be provided for bolting or other rigid securement to the top of side walls 12, mounting plate 40 thereby providing a mounting means for mounting rails 20 securely elevated above sidewalls 12 so as to extend longitudinally along the length of sidewalls 12 between cab 24 and tailgate 16.

The rearmost end of canopy 10 is supported on a carriage collectively indicated by the number 42. The components of carriage 42 are seen in FIGS. 8–13. Carriage 42 is comprised of three basic components, namely, carriage shoe 44, carriage hoop 46, and carriage face plate 48. Carriage shoe 44, carriage hoop 46, and carriage face plate 48 form a rigid structure, generally triangular in longitudinal cross-section when viewed side-on and extending laterally between opposed rails 20 across the rearmost end of canopy 10.

Carriage shoe 44 is, in a manner similar to shoes 34, in the shape of an inverted U in lateral cross-section for snug sliding fitment over rails 20. Also in a manner similar to shoes 34, carriage shoes 44 have journalled in their upper end and mounted thereto vertically oriented wheels 36, again for transmitting a vertical force component downwards onto an upper bearing surface along the tops of rails 20. Carriage shoes 44 also have horizontally oriented wheels 50 journalled in and mounted to the outermost sides of carriage shoes 44 for transmitting a horizontal force component against a bearing surface along the outermost sides of rails 20.

Hoops 26 and carriage hoop 46 may be of 1 inch diameter 16 gauge steel tubing. Carriage face plate 48 may be constructed in a truss-like manner as illustrated in FIG. 9 from ⅛ inch thick by ½ inch wide flat bar steel.

To address the problem commonly encountered in prior art deployable canopies as described above, namely that the canopies in order that they could be deployed smoothly without binding along the rails or tracks require complicated mechanical systems, Applicant has determined that if carriage 42 is sufficiently rigid and stable in relation to rails 20 that the complicated mechanisms in the prior art are not required. Thus, without any complicated mechanisms, a user may merely apply a force in direction A to one side of carriage 42 and carriage 42 will move by sliding or rolling on its wheels over rails 20. Consequently, if canopy 10 is being deployed, pulling canopy 10 pulls hoops 26 along with carriage 42 until canopy 10 is taut against the resilient biasing return force of springs 32.

Figure 8:
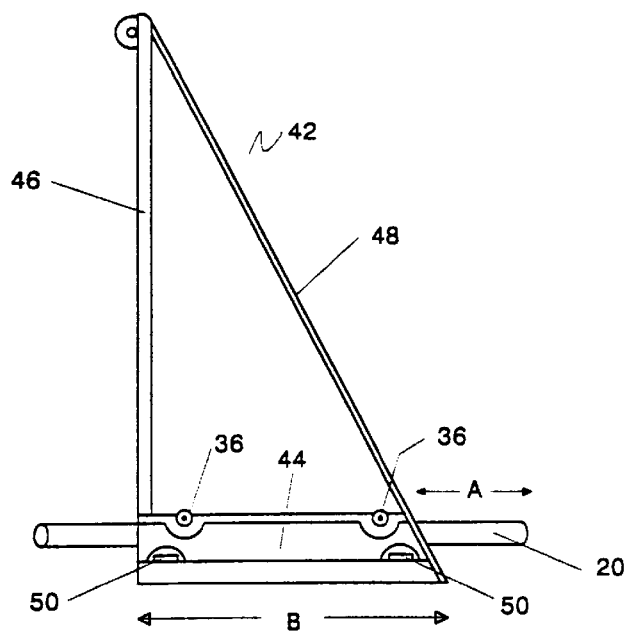
FIG. 8 is, in side elevation view, the carriage of the retractable vehicle canopy of the present invention.

The stability and rigidity of carriage 42 is obtained primarily in three ways. The first is that carriage 42 is in longitudinal cross-section triangular, being comprised of the rigid mounting of carriage shoe 44 to carriage hoop 46 and carriage face plate 48 and the rigid mounting of carriage hoop 46 and carriage face plate 48 so as to form a triangular cross-section, such as illustrated in FIG. 8. Secondly, the stability of carriage 42 is determined by the longitudinal dimension of carriage shoe 44 in direction B, the greater the length of carriage shoe 44 the greater the stability. Thirdly, the stability of carriage 42 is greatly improved by constructing carriage hoop 46 and carriage face plate 48 so that their dimension in direction C is somewhat smaller than the dimension between rails 20 also measured in direction C. Thus, in order to mount carriage 42 into sliding engagement on rails 20, carriage hoop 46 and carriage face plate 48 must be flexed laterally outwards in direction C by a sufficient distance to cause wheels 50 to exert a horizontal, and preferably evenly distributed force against rails 20, when carriage shoes 44 are mounted on rails 20.

Figure 9:
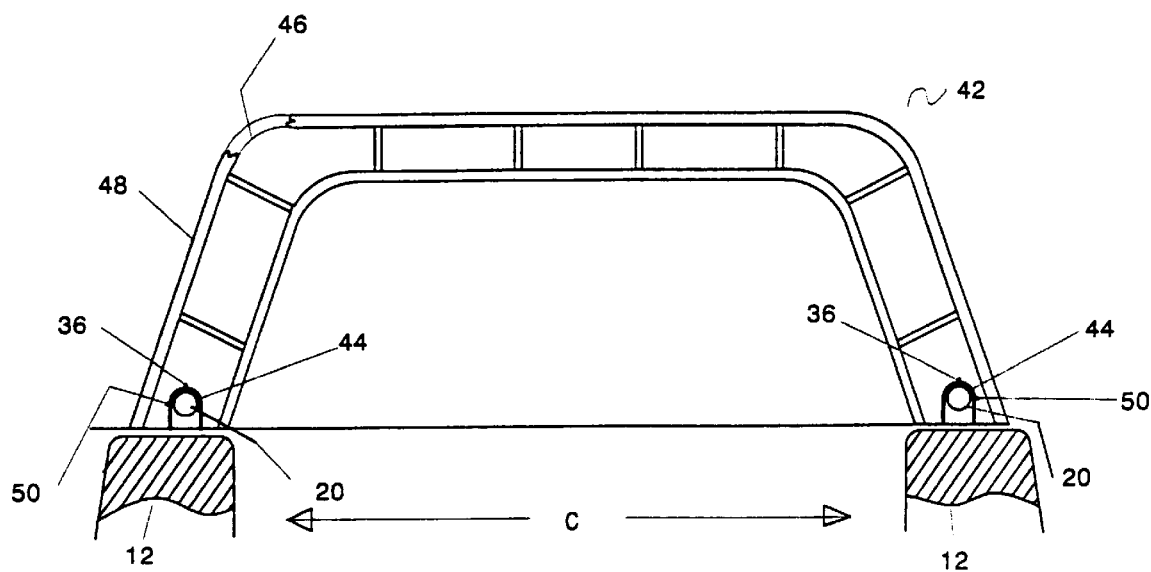
FIG. 9 is, in rear elevation view, the carriage of FIG. 8.
Figure 11:
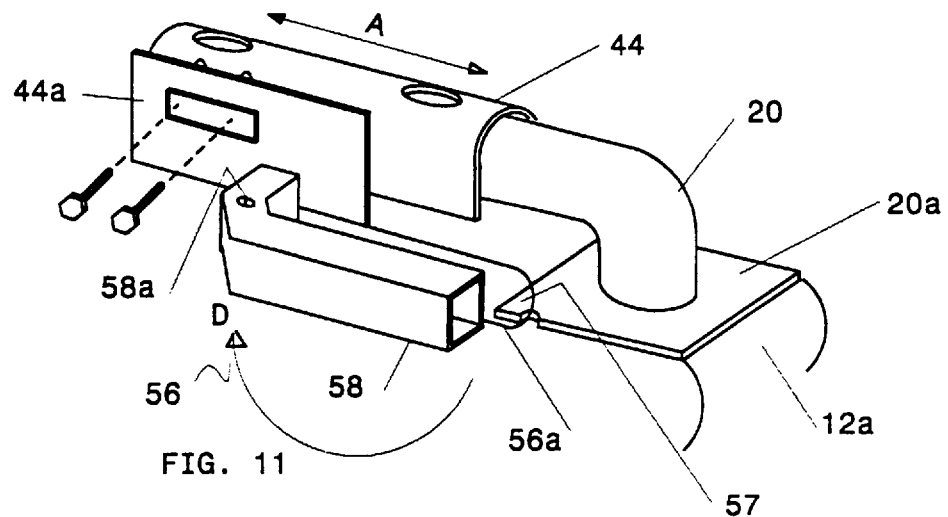
FIG. 11 is, in perspective view, the carriage latching mechanism of the carriage of FIG. 8.
Figure 10:
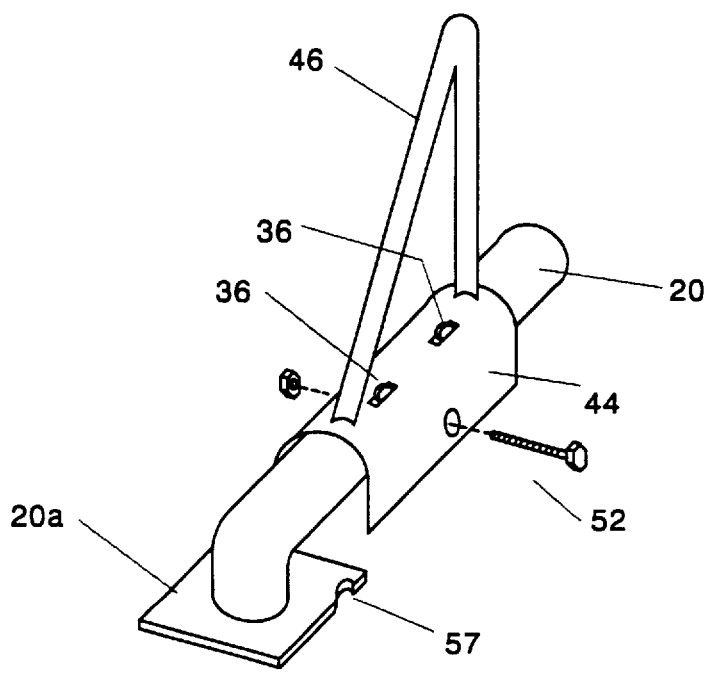
FIG. 10 is, in partially cut-away partially exploded perspective view, a carriage shoe of the carriage of FIG. 8.
Figure 12:
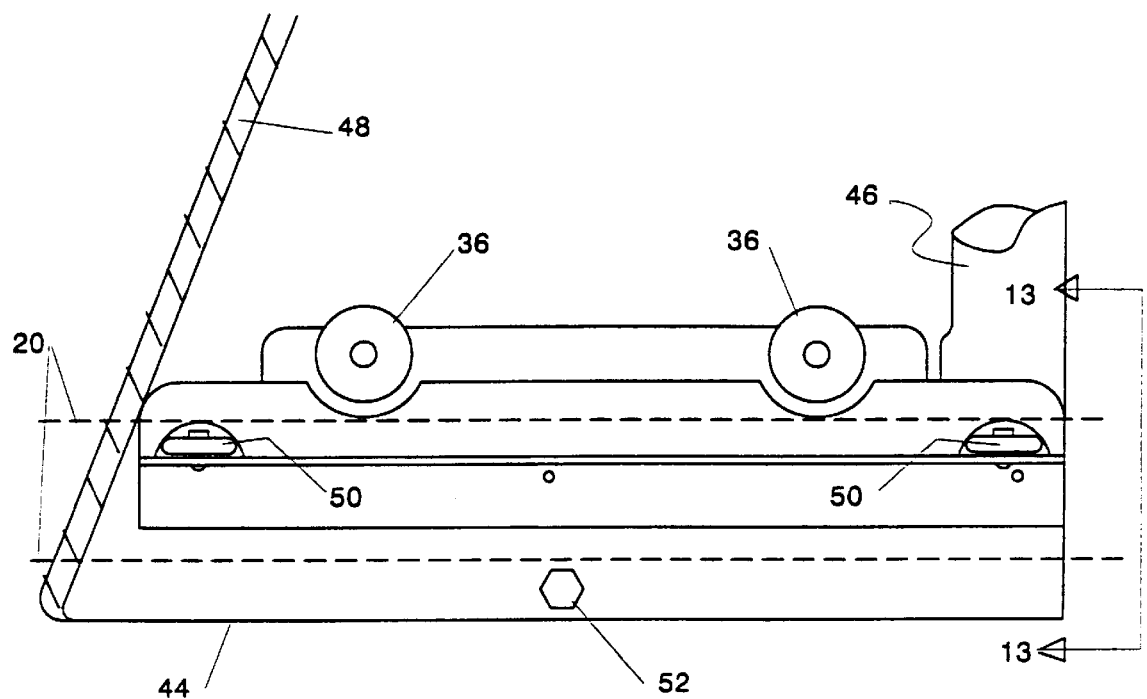
FIG. 12 is, in side elevation, partially cut-away view the carriage shoe of the carriage FIG. 8.

It has been determined that in the embodiment of the present invention where carriage hoop 46 is made of 1 inch diameter 16 gauge tubing and carriage face plate 48 is made of ⅛ inch by ½ inch flat bar steel in the manner illustrated in FIG. 9, that the distance which carriage hoop 46 and carriage plate 48 must be flexed or spread outwards in direction C is approximately 1 inch in total to result in approximately 15 to 20 pounds pressure exerted by wheels 50 on rails 20. Of course, with different materials of manufacture, the distance that carriage hoop 46 and carriage face plate 48 must be spread or flexed outwards in direction C may differ depending on the rigidity of materials so as to exert 15 to 20 pounds pressure on rails 20 by wheels 50.

In alternative embodiments, it may be that 15 to 20 pounds of pressure could be varied more or less and the operative stability of carriage 42 not seriously adversely affected. For example, if the pressure exerted by wheels 50 on rails 20 was less than 15 to 20 pounds, the stability could be maintained by increasing the longitudinal dimension of carriage shoe 44. Conversely, the longitudinal dimension of carriage shoe 44 could be reduced if the pressure exerted by wheels 50 on rails 20 was increased. Further, an alternative embodiment of sufficient rigidity and stability could be accomplished without the requirement of carriage 42 having a triangular longitudinal cross-section if for example hoop 46 was sufficiently rigid and advantageously mounted equidistant between wheels 50 so as to distribute the pressure on rails 20 evenly between wheels 50.

Figure 13:
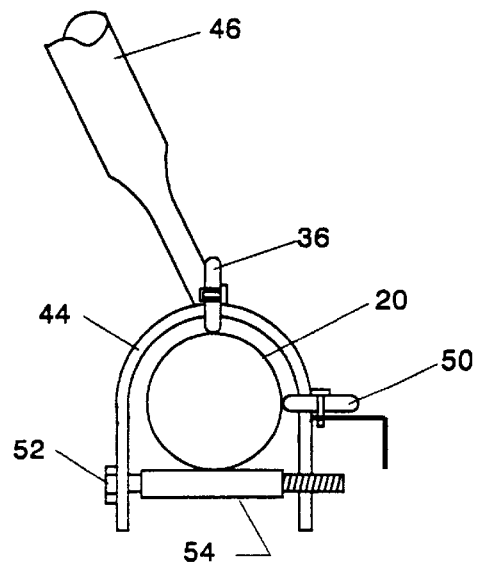
FIG. 13 is a cross-sectional view along line 13—13 in FIG. 12.

As illustrated in FIG. 13, advantageously carriage shoe 44 has bolts 52 which, in the manner similar to bolts 38 on shoes 34, act to prevent carriage shoes 44 from inadvertently releasing vertically from sliding engagement on rails 20.

In further alternative embodiments, wheels 36 and 50 could be replaced by sliding plates of TEFLON, polytetrafluorethylene, or the like (although binding may be encountered) or by fitted sleeves having bearings mounted between the sleeves and rails 20 so as to allow the smooth sliding of shoes 34 and carriage shoes 44 on rails 20. In the embodiment depicted in FIG. 13, advantageously, bolts 52 have protective sleeves 54 mounted thereon below rails 20.

Carriage shoes 44 may be urged along rails 20 in direction A so as to extend over a rearmost edge 12a of side walls 12 by means of a latch mechanism 56 seen in FIG. 9 mounted on carriage shoes 44 by means of mounting plate 44a, whereby for example a loop 56a may be hooked over a protrusion or hook 57 extending from side wall 12 (for example from the mounting plate 20a of rail 20) and the loop 56a tensioned by means of an overcenter lever 58 rotatable in direction D about pin 58a. The overcenter lever 58 causes carriage shoe 44 to be urged along rail 20 in direction A so as to make canopy 10 taut against the return biasing force of springs 32.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A retractable vehicle canopy for a vehicle, said retractable vehicle canopy comprising:

a pair of guide means mountable longitudinally in parallel opposed relation on opposite sides of a vehicle load bed so as to extend said guide means longitudinally in a first direction along said load bed, a carriage member releasably mountable into sliding engagement with said guide means so as to extend said carriage member laterally across said load bed in a second direction, perpendicular to said first direction, between said pair of guide means extending longitudinally in said first direction, said carriage member comprising a hoop member rigidly mounted to and extending between carriage shoes mounted to opposite ends of said hoop member, said carriage shoes releasably mountable into sliding engagement along said guide means, said carriage shoes comprising sliding pressure transfer means for applying a first force vertically downward from said hoop member onto upper bearing surfaces on said guide means, and a second force generally horizontally inwards in said second direction against corresponding lateral bearing surfaces on said guide means, said hoop member having a flexed lateral dimension in said second direction when measured between opposed ends of said hoop member, when releasably mounted in sliding engagement with said guide means, that is greater than a non-flexed lateral dimension measured between said opposed ends of said hoop member when said hoop member is removed from said guide means, wherein said hoop member is resiliently spreadable between a non-flexed position and a flexed position corresponding to said non-flexed dimension and said flexed dimension respectively, whereby said hoop member may be spread laterally outwardly in said second direction for releasable slidable mounting of said carriage shoes into sliding engagement with said guide means, a flexible canopy releasably mountable at a rear edge thereof to said carriage member and at a forward edge thereof to said vehicle whereby when said carriage is slid along said guide means in said first direction said canopy may be deployed over said load bed or retracted so as to uncover said load bed, said carriage member releasably latchable by latching means to a rearmost end of said load bed, said hoop member sufficiently rigid so as when in said flexed position, said carriage shoes are releasably mountable into sliding engagement with said guide means, and said second force is thereby applied against said corresponding lateral bearing surfaces on said guide means, and wherein said carriage shoes have a longitudinal dimension in said first direction when releasably mounted into sliding engagement on said guide means so as to stabilize said hoop member in relation to said guide means and to equally distribute said second force along said corresponding lateral bearing surfaces on said guide means.

2. The retractable vehicle canopy of claim 1 wherein said guide means are a laterally spaced apart pair of guide rails mountable onto side walls of said load bed, and wherein said sliding pressure transfer means are wheels mounted to said carriage shoes so as to be operatively disposed between said carriage shoes and said guide rails to facilitate smooth sliding of said carriage shoes over said guide rails when said first and second forces are applied by said sliding pressure transfer means against said upper bearing surfaces and said corresponding lateral bearing surfaces on said guide rails.

3. The retractable vehicle canopy of claim 2 wherein said hoop member is stabilized relative to said carriage shoes by a second member extending from an uppermost end of said hoop member to said carriage shoes so as to form a triangular frame in longitudinal cross-section between said hoop member, said second member, and said carriage shoes.

4. The retractable vehicle canopy of claim 3 wherein secondary hoops are mounted for sliding engagement along said guide rails between said forward edge of said canopy and said rearmost edge of said canopy and releasably mounted to an interior surface of said canopy whereby when said canopy is deployed by sliding of said carriage along said guide rails in said first direction, said secondary hoops are pulled by said canopy along said guide rails so as to support said canopy over said load box.

5. The retractable vehicle canopy of claim 1 wherein said canopy may be releasably tensioned so as to be pulled taut over secondary hoops slidably mounted over said load bed, said canopy releasably tensioned by resilient tensioning means mounted between said forward edge of said canopy and a forward end of said load bed.

* * * * *